INVENTOR.
Edwin E. Turner
BY
Attorney

United States Patent Office 3,274,535
Patented Sept. 20, 1966

3,274,535
PROPAGATION VELOCITY CORRECTION FOR
DOPPLER LOG
Edwin E. Turner, Newport, R.I., assignor, by mesne assignments, to the United States of America as represented by the Secretary of the Navy
Filed Sept. 14, 1964, Ser. No. 396,439
6 Claims. (Cl. 340—3)

The present invention relates generally to velocity measuring systems and, more particularly, to a Doppler type velocity measuring system for nautical vehicles which contains a provision for correcting automatically for variations in the velocity of sound propagation in the fluid medium brought about by temperature changes.

In the conventional Doppler navigation system, as is well known, the velocity of the vehicle is determined by measuring the frequency shift between the transmitted and received signal. For this Doppler shift frequency to have significance as a measure of the vehicle's nautical velocity, it is necessary that the actual velocity of signal propagation through the fluid medium be known.

If the transmitted frequency of the sound energy propagated in the fluid medium is $F_t$ and the frequency of the sound energy reflected from the terrain below the craft is denoted $F_d$, then it can be shown that $F_d$ is related to $F_t$ as follows:

(1) $$F_d = F_t \left( \frac{c + v \cos \theta}{c - v \cos \theta} \right)$$

In this equation $c$ is the velocity of wave propagation of the sound energy, $v$ the vehicle celocity in th direction of the transmitted and reflected energy and $\theta$ is the angle between the direction of transmitted energy and the horizontal, the so-called depression angle. Because $v$ for most nautical vehicles is normally much less than $c$, Equation 1 can be written with negligible error as follows:

(1) $$F_d \cong F_t \left( 1 + 2\frac{v}{c} \cos \theta \right)$$

The velocity of sound in sea water in influenced by several factors, namely, density, salinity and temperature. However, for surface operation and in waters not mixed with the outflow of rivers or harbors, this velocity, in solving for vehicle velocity, can, to a good approximation, be considered as varying only with the temperature of the sea water. In order to correct for changes in $c$ occasioned by temperature variations in the fluid medium, the present invention in its generic form introduces appropriate changes in the angle $\theta$, the deflection angle. For instance, if the velocity of sound propagation in the fluid medium increases by virtue of a small temperature increase, the apparatus of the present invention alters the direction of the transmitted sound energy to decrease proportionally the angle $\theta$ and causes the sound beam to impinge against the ocean bottom at a more acute angle. If these changes in the direction of the transmitted sound are properly made, the system will develop constant Doppler frequency shifts for corresponding vehicle velocities over the ocean bottom regardless of the temperature condition of the sea water through which the vehicle moves.

In one illustrative embodiment of the present invention, the angle of projection of the sound beam is varied by mechanical means associated with the sound transducer. This apparatus automatically alters the orientation of the transducer in response to the temperature of the adjacent sea water.

In an alternative embodiment, the same result is accomplished with a stationary, multi-element, crystal transducer whose energization is phased so that the sound beam emanating therefrom shifts direction as the vehicle and/or transducer encounters different temperature zones. More particularly, in this second arrangement, the piezoelectric crystals which behave electrically as capacitative elements are associated with a number of inductance elements to form a suitable electrical delay line. By designing these inductive elements with a predetermined inductive reactance versus temperature characteristic and by disposing them in a location where they are in thermal contact with the adjacent fluid medium, the electrical performance of the delay line, as well as the directional pattern of the transducer, can be made to vary in an appropriate manner with the temperature of the sea water. Thus, for example, if the vehicle moves into a region of higher temperature, the time relationship between the energization of the various crystals in the transducer changes automatically and the beam is electrically shifted from its previous attitude upwardly to a new position which compensates for the higher value of the sound velocity encountered in this increased temperature zone.

It is accordingly a primary object of the present invention to provide a Doppler type velocity measuring system for nautical vehicles which compensates automatically for variations in the velocity of sound propogation in the fluid medium brought about by temperature variations.

Another object of the present invention is to provide apparatus for modifying direction of propagation of a sound beam employed in a Doppler navigation system to compensate for changes in the velocity of propagation of the sound energy in the fluid medium.

A still further object of the present invention is to provide an electrical arrangement for shifting automatically the direction of propagation of a radiated sound beam employed in a Doppler navigation system to offset changes in the velocity of propagation of the sound energy brought about by temperature conditions.

Other objects, advantages and novel features of the invention will become apparent from the following detailed description of the invention when considered in conjunction with the accompanying drawings wherein.

Figure 1:
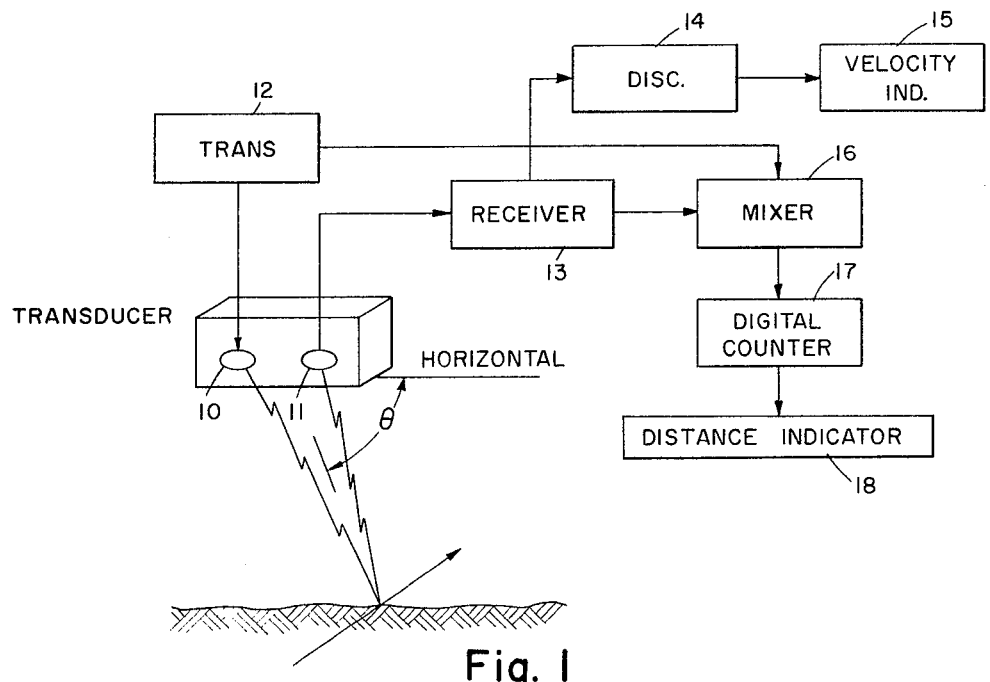
FIG. 1 illustrates a prior art Doppler type velocity measuring system in which the present invention can be used.

Referring now to FIG. 1 of the drawings which shows a velocity measuring arrangement of the type disclosed in applicant's U.S. Patent No. 3,065,463, issued Nov. 20, 1962, it will be seen that this circuit includes separate transducers 10 and 11 for propagating sound energy and for receiving this energy after its reflection from the ocean bottom. Although this system employs a pair of transducers, it should, of course, be appreciated that a single transducer operating sequentially in the transmitting and receiving modes can be used. Transducer 10, which is mounted in the base of the vehicle (not shown), in this modification is coupled to and energized by transmitter 12. Transducer 11 is coupled to receiver 13. One output of this receiver is directly fed to a discriminator 14 which utilizes its center frequency as a reference to develop a D.C. signal proportional to vehicle velocity. The output of discriminator 14, as is well known, can be measured by a simple D.C. voltmeter 15.

The output from receiver 13 and the output from transmitter 12 are applied to a mixer 16, and the Doppler beat frequency produced therein, which is proportional to the speed over the ocean bottom for a given angle $\theta$ and for a given radiated frequency $F_t$, is coupled to a digital counter 17. This counter, in effect, counts the beat frequency for a given interval of time as fixed by the carrier. By reducing the countdown, the distance integration can be adjusted to any desired value, such as, approximately sixty feet or one hundred counts for every nautical mile. In this manner, distance can be obtained directly on indicator 18 without first obtaining velocity.

In the system of FIG. 1 the radiated beam is prearranged to impinge against the sea bottom at a given angle $\theta$ when the velocity of sound propagation in the fluid medium has a predetermined value. For example, $\theta$ may be forty-five degrees when the sound velocity is forty-eight hundred feet per second corresponding to a sea temperature of about twenty degrees centigrade.

If the temperature of the sea in the vicinity of the transducer increases above the aforementioned value causing the velocity of sound propagation to likewise increase, this change, if not taken into account, would introduce a source of error into the vehicle velocity as indicated by voltmeter 15. To prevent this, the present invention, as pointed out, provides means for varying automatically the angle $\theta$ as the transducer encounters different temperature regions.

Figure 2:
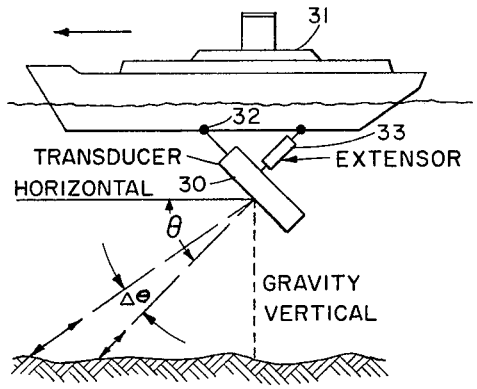
FIG. 2 illustrates a simple mechanical arrangement for changing the direction of radiation of the sound beam in response to variations in ocean temperature.

Referring now to FIG. 2 of the drawings which shows a simple, mechanical arrangement for changing this angle $\theta$, it will be seen that in this embodiment transducer 30, which can be of conventional design, is pivotally secured at one side to the underside of vehicle 31 or an extension thereof at point 32 so as to be capable of assuming various angular positions. Interposed between the backside of this transducer and a confronting part of the vehicle is an extensor 33. This extensor, which can take a wide variety of forms, functions to vary the angular disposition of the transducer 30 as this apparatus encounters regions of different temperature. In its simplest form, extensor 33 may be a simple extension rod made of a material having a positive temperature coefficient. If this temperature coefficient is properly selected, then, as transducer 30 moves into, for example, a region of increased temperature, extensor 33 will expand and cause transducer 30 to pivot in a clockwise fashion about point 32. Thus, instead of the sound beam being radiated at the forty-five degree angle mentioned hereinbefore, this angle will be decreased by an amount $\Delta\theta$ to offset the higher velocity of sound propagation encountered in this zone of increased temperature. Consequently, for a fixed vehicle velocity over the ocean bottom, indicator 15 in the system of FIG. 1 will indicate a constant value even though the sound velocity changes.

Instead of extensor 33 taking the form of a solid rod, this structure can consist of a spring-loaded piston and chamber arrangement. If this chamber is filled with a fluid whose volume changes with temperature, then the piston displacement can be utilized to correct the attitude of transducer 30.

Figure 3:
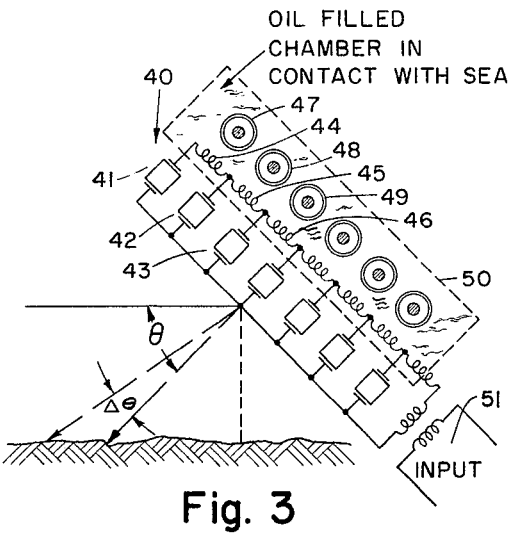
FIG. 3 illustrates an electrical system which also can be employed to change the direction of sound radiation.

In FIG. 3 there is illustrated an alternative embodiment of the present invention wherein the transducer 40 is maintained stationary and its beam caused to shift by electrical means. Here, the transducer consists of a number of piezoelectric elements, such as 41, 42, 43, arranged in a matrix or array of conventional design. These piezoelectric elements, as is well known, are provided with metallic electrodes, and their electrical behavior is similar to that of capacitative devices.

In the present invention, the various piezoelectric elements of the transducer are interconnected by inductive elements, such as 44, 45 and 46. These inductive elements are toroidal coils wound on temperature-sensitive ferrite cores and they coact with the crystals to form an electrical delay line.

The ferrite cores, such as 47, 48, 49, and their affiliated coils, such as 44, 45, 46, are accommodated within an oil-filled container 50 which is arranged to be in thermal contact with the adjacent seawater. The temperature of these cores, therefore, fluctuates with the temperature of the seawater in the vicinity of the sound transducer. Consequently, if the inductance of the coils versus the temperature of the cores characteristics are properly selected, the performance of the delay line will be such that the sound beam will shift its direction with sea temperature to compensate for the accompanying variations in the velocity of sound. The above temperature versus inductance characteristics can be varied, as is well known, over relatively wide limits by selecting the proper chemical composition of the ferrite cores and by the heat treatment and coil fabrication procedures.

It would be pointed out that the angle of projection of the sound beam can be adjusted automatically and continuously to the proper value for a given ocean temperature by either the mechanical or electrical method noted above or both of them in combination.

Obviously many modifications and variations of the present invention are possible in the light of the above teachings. It is therefore to be understood that within the scope of the appended claims the invention may be practiced otherwise than as specifically described.

What is claimed is:

1. In a system for determining the velocity of a vehicle moving through a fluid medium of the type wherein a sound beam of a given frequency is radiated from said vehicle at a given depression angle with the horizontal and the echo signal which is thereafter reflected from the bottom is compared with the radiated signal to produce a Doppler shift signal indicative of said velocity, the improvement of automatically varying the depression angle at which said sound beam is radiated in response to changes in the temperature of the surrounding fluid medium, thereby to compensate for changes in the velocity of sound propagation occurring as a result of said temperature changes.

2. In a velocity measuring system of the type wherein a vessel radiates a sound signal which is propagated at a given angle with the horizontal and wherein this signal is subsequently detected after its reflection from the bottom and its frequency compared with that of the radiated signal to produce a Doppler shift signal indicative of said vehicle velocity, the improvement of automatically altering said angle as the temperature of the fluid medium surrounding said vehicle changes from a reference level, thereby to compensate for variations in the propagation velocity of said radiated sound signal.

3. In a Doppler-type velocity measuring system for nautical vehicles, the subcombination of a sound transducer pivotally mounted on said vehicle and orientated to radiate a sound signal which strikes the ocean bottom at an acute angle, is reflected therefrom and subsequently detected by said transducer;

and mechanical means coupled to said transducer for changing the orientation of said transducer and the angle at which said sound beam strikes the ocean bottom as the temperature of the ocean water in the vicinity of said transducer varies, thereby to compensate for the changes in velocity of propagation of said sound signal accompanying said temperature changes.

4. For use in a Doppler-type velocity measuring system for nautical vehicles, the subcombination of a transducer mounted on said vehicle and adapted, when energized, to radiate a sound signal along a direction which is at a predetermined depression angle with respect to the horizontal when the ocean in the vicinity of said transducer is at a given temperature level, which sound signal strikes the ocean bottom, is reflected therefrom and subsequently detected by said transducer, said transducer consisting of an array of piezoelectric elements and a multiplicity of inductances interconnecting said piezoelectric elements in an electrical delay line circuit, said inductances having temperature versus inductance characteristics such that when the temperature of said inductances changes from said given temperature level said depression angle is proportionately changed, being decreased and increased when the temperature increases and decreases, respectively, the amount by which said depression cycle changes being related to the change in the velocity of sound propagation in the ocean area in the vicinity of said transducer;

and means for maintaining said inductances in thermal contact with the ocean in the vicinity of said transducer.

5. For use in a Doppler-type velocity measuring system for nautical vehicles, the subcombination of a transducer mounted on said vehicle and adapted, when energized, to radiate a sound signal which normally is propagated in the direction which makes a predetermined acute angle with respect to the horizontal, said transducer comprising a matrix of piezoelectric elements;

a multiplicity of inductances interconnecting said piezoelectric elements in an electrical network;

said inductances having temperature versus inductance characteristics such that there is a predetermined relationship between the magnitude of said acute angle and the velocity at which said sound energy is propagated in the ocean area adjacent to said transducer;

and means for maintaining said inductances in thermal contact with the ocean area adjacent said transducer, whereby the magnitude of said acute angle varies in accordance with the temperature of the adjacent ocean area and whereby the frequency of the sound energy detected by said transducer remains fixed as said vehicle proceeds at a constant velocity through ocean areas of different temperature.

6. A system as described in claim 5 wherein said means for maintaining said inductances in thermal contact with the ocean area comprises a common enclosure housing said piezoelectric elements and said inductances, said enclosure being filled with oil and the exterior of said housing being in contact with the ocean.

No references cited.

CHESTER L. JUSTUS, *Primary Examiner.*

R. A. FARLEY, *Assistant Examiner.*